United States Patent Office 3,445,836
Patented May 20, 1969

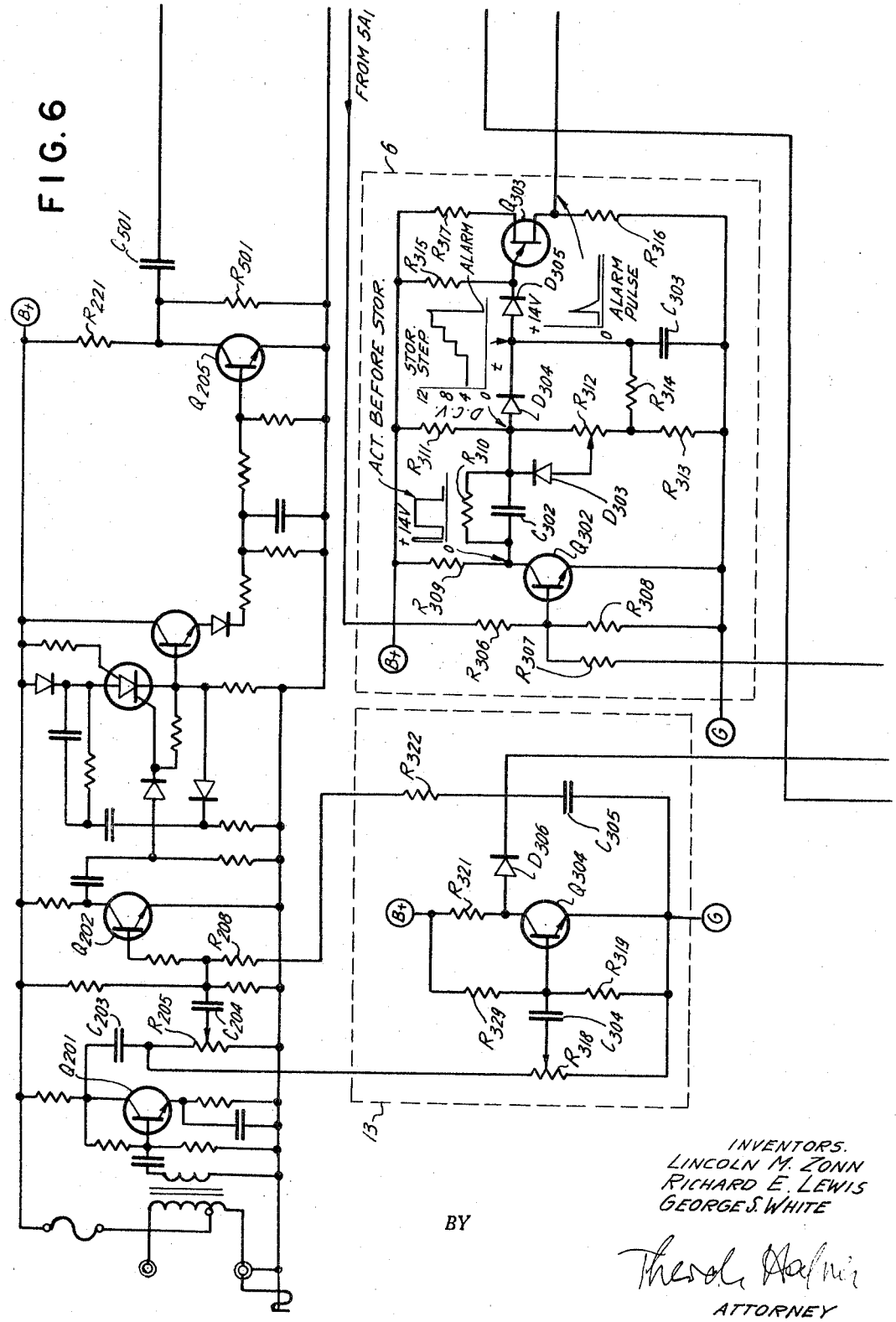

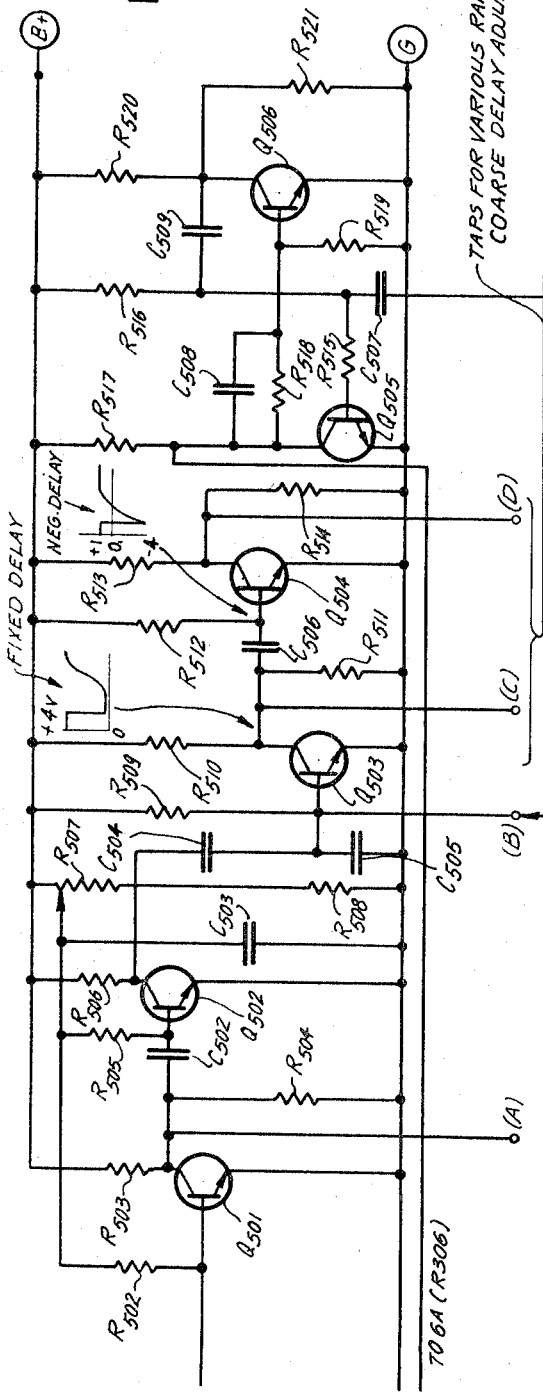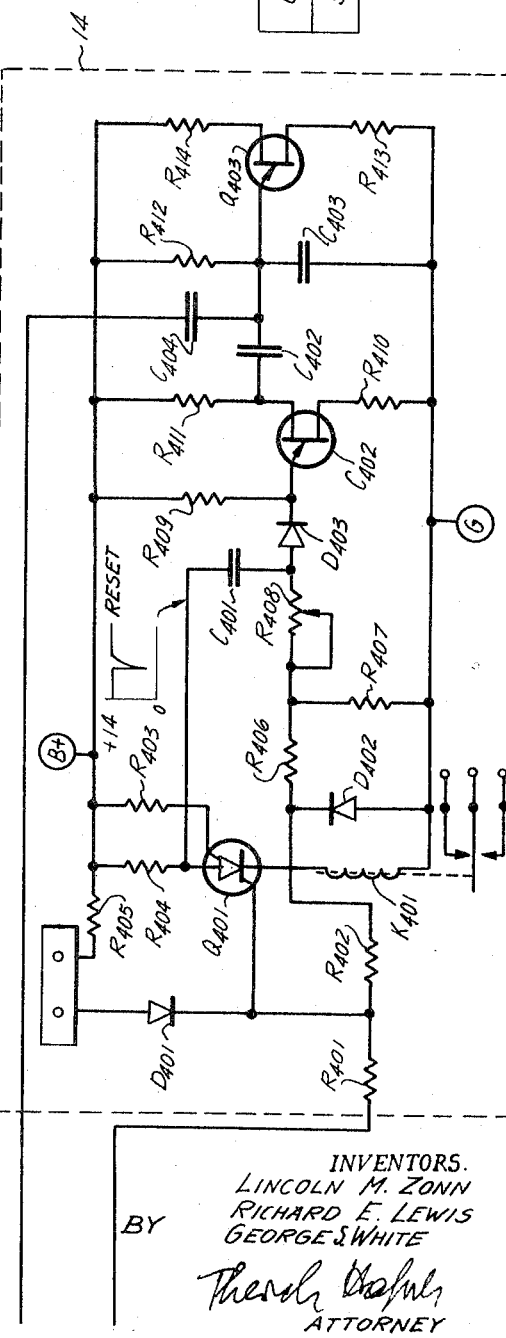

3,445,836
AUDIO DETECTION ALARM SYSTEMS
George S. White, Upper Montclair, and Richard E. Lewis, Nutley, N.J., and Lincoln M. Zonn, New York, N.Y., assignors to R & D Electronics, New York, N.Y., a corporation of New York
Filed Feb. 28, 1966, Ser. No. 526,195
Int. Cl. G08b 21/00
U.S. Cl. 340—261                                10 Claims

ABSTRACT OF THE DISCLOSURE

The invention consists in substance of arranging in a sound controlled alarm system a number of pickups exposed to alarm activating noise and to ambient noise respectively and to produce, under control of these pickups, pulses representative of these different noises to derive an alarm signal whereby these pickups include electromechanical transducers, preamplifiers and automatic level controls for each of the pulse producers in accordance with the level of the ambient noise producer.

---

This invention relates to an audio detection alarm system and more specifically to utilizing only a given portion of the entire audio frequency range of the order of about 100 cycles to about 16,000 cycles.

Another object of the invention is when using a portion only of the audio frequency range, to couple this information to transistorized circuitry of such characteristics as to accept the information, convert it into pulses and use the pulses to control a group of semiconductor circuits capable of processing this signal, digest it, and initiate an alarm or activating signal condition out of the multitude of sounds which would be normally picked up by electromechanical transducer devices.

A specific object of the invention is an electromechanical pickup device such as a microphone or a small loudspeaker (on the order of 1¼ inches to about 8 inches in diameter) and to directly couple the pickup terminals to a transistorized preamplifier having input and output impedance characteristics capable of compensating the input and output circuit characteristics of the standing impedance and the reflected impedance as seen from its output terminals to the input terminals of the following main channel.

A further object of the invention is an impedance equalizer circuit permitting the use of standard two-conductor wire, in place of shielded wire, and more specifically a multi-impedance, split winding input transformer and circuitry designed to allow simultaneous operation of at least 30 to 50 electromechanical pickups complete with their associated transistorized preamplifiers, which could be wired in parallel without incurring any noticeable loss.

Still further an object of the invention is to have each of the remote transistorized electromechanical pickup devices receive or derive their DC operating current over the same two conductors used to carry the AC signal voltage to the input terminals of the main channel, the latter including separate input transformers and separate transistorized impedance matching circuitry for each pickup, each of the transistorized preamplifiers deriving its operating DC current and working voltage from the pair of wires carrying the audio signal from the output of the preamplifier to a portion of the split primary winding of a multiimpedance input transformer, connected in such a manner as to permit it to supply at least 50 transistorized preamplifier units, 25 units on each half of the primary winding, and to operate over the desired range with a minimum of signal loss due to any increase in AC signal, depending on the turn ratio of the transformer and its permeability co-efficient in relation to the core substance, and the type of primary and secondary windings used.

These and other objects of the invention will be more fully apparent from the drawings annexed herein in which FIGURE 1 shows in block diagram the overall layout of an alarm system embodying certain features of the invention, naming important areas of circuitry and showing the paths taken by the signal as it progresses along through each stage.

This and the other block diagrams in the disclosure are so arranged that the currents through each stage can be followed from input to output.

In certain stages it has been found necessary to show a wave form for the pulse information present in each stage as the signal progresses from stage to stage from the input to the output of the circuitry.

Figure 4:
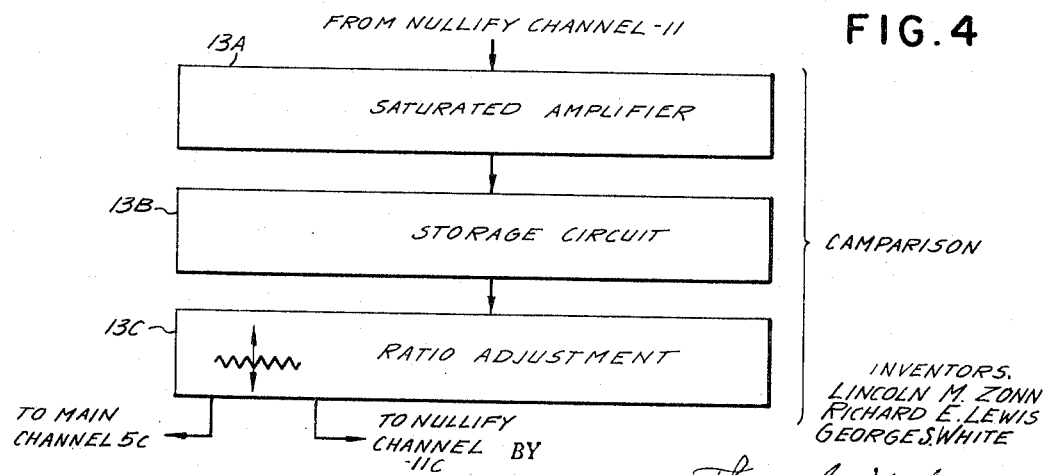

FIG. 4 also in block diagram shows important areas of the automatic level control channel.

Figure 5:
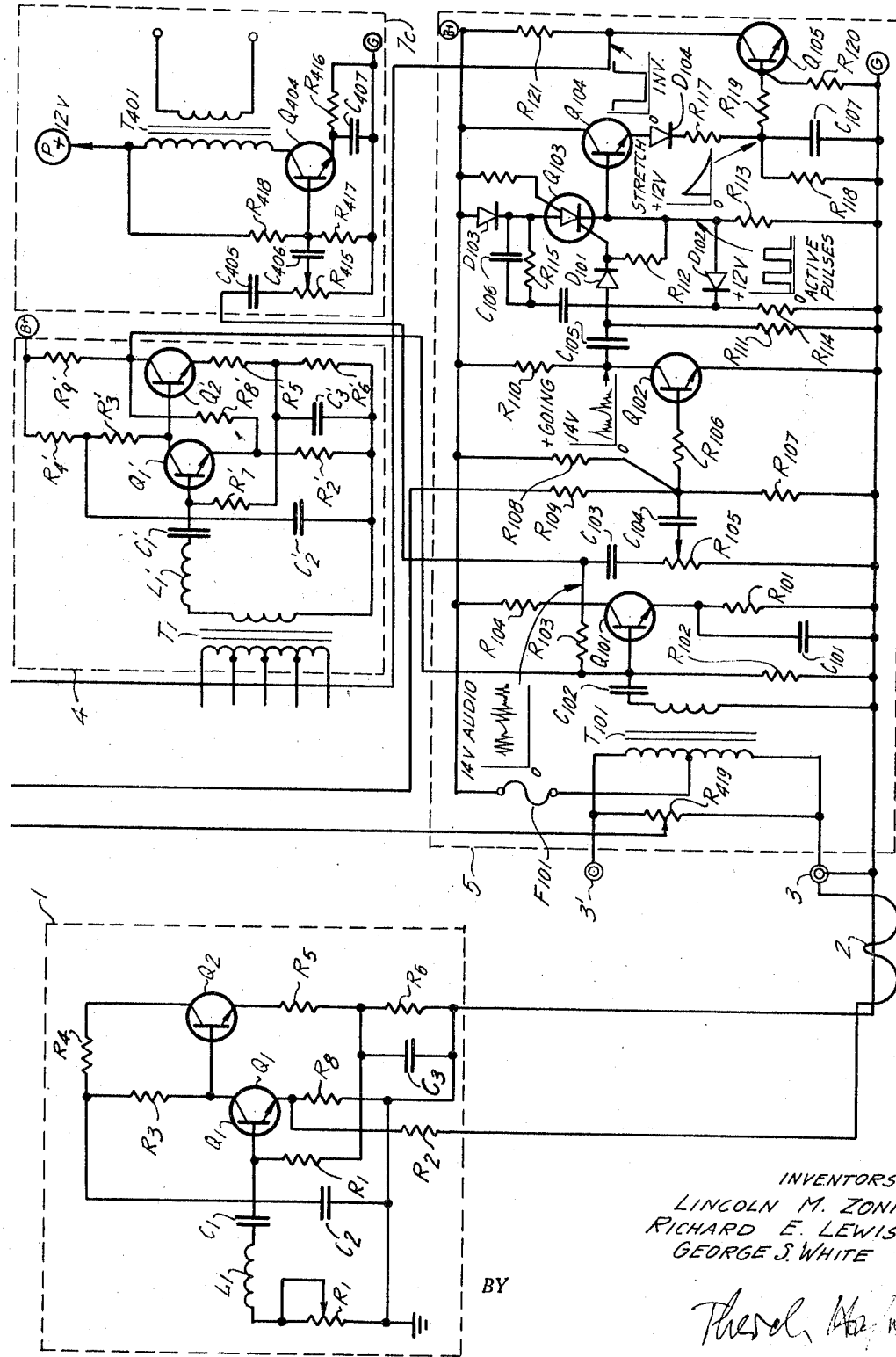

FIGS. 5, 6 and 7 to be arranged for interconnection as shown in FIG. 7A, illustrate in still greater detail the circuitry of a system such as indicated in FIGS. 1–4.

Figure 8:
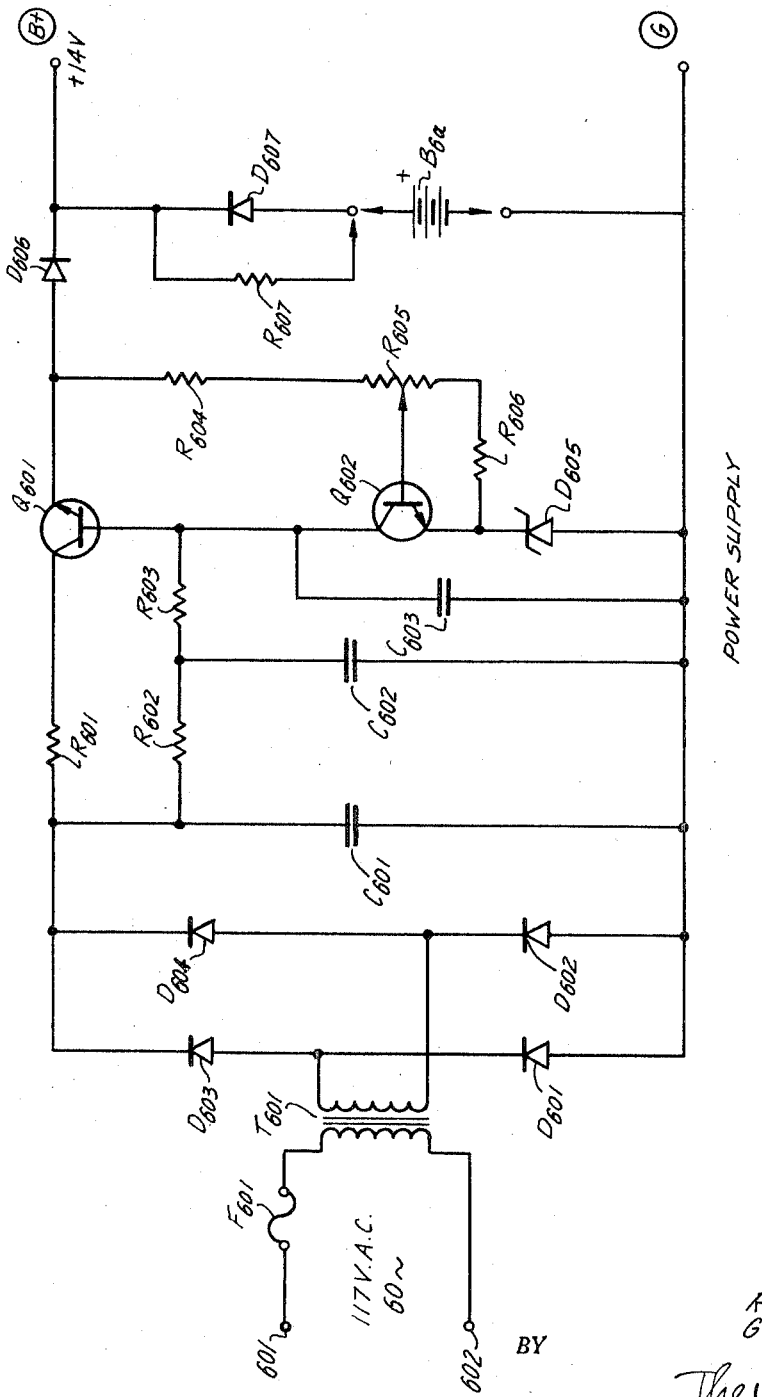

FIG. 8 shows a power supply for the circuits of FIGS. 5, 6 and 7.

Figure 1:
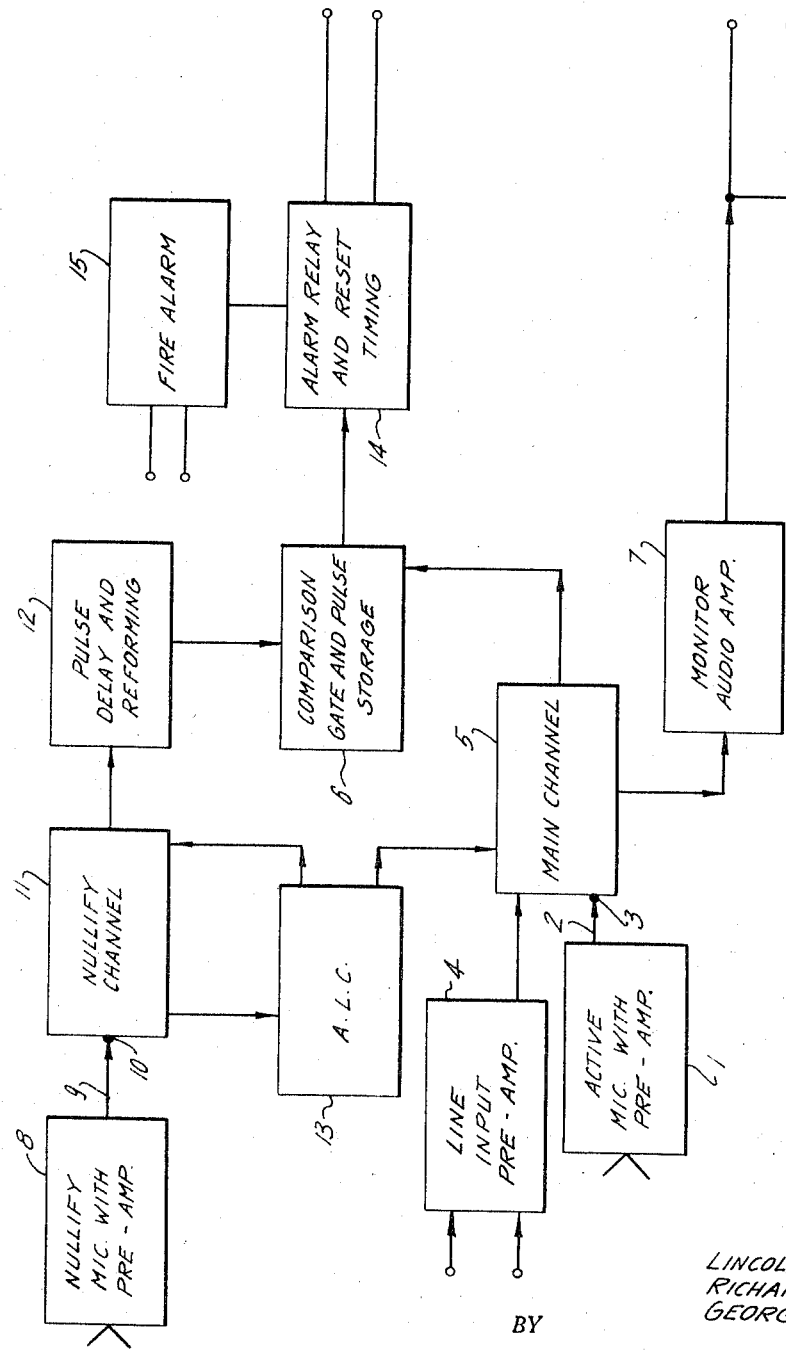

In FIG. 1, part 1 represents an alarm activating sound pick-up device or electromechanical transducer (in contrast to an ambient pickup device as schematically illustrated at 8) which in combination with a self contained transistorized preamplifier and filter is capable of acting upon the alarm relay proper after having filtered out the unwanted audio and radio frequencies. Part 1 is arranged to pick up sounds at a point remote from the main alarm unit, and by combining an electromechanical transducer with a transistorized impedance equalizing amplifier circuitry, it is adapted to detect any attempt to break into an area to be protected.

Part 1 is so designed as to be connected by a standard two-conductor solid or stranded wire line 2 from the output terminals of the preamplifier to the input terminals of the main or alarm activating channel 5, and more particularly to its input terminal 3.

Part 4 represents a preamplifier controlled from any public address or intercom system, arranged to permit use of existing loudspeakers to pick up sounds in the area where they are installed. Preamplifier 4 is designed to amplify the minute signal received at its input terminals to a level appropriate for the operation of main channel 5. In main channel 5 the sound signals derived from preamplifiers 1, 4, respectively (or their corresponding microphones), are combined and shaped into pulses of predetermined shape and repetition rate as will be explained further below.

Transistorized preamplifier 1 may be controlled through an impedance equalizing circuit by a number of active microphones or sound pickups placed at strategic locations in an area to be protected from any form of entry or intrusion.

The pulses derived from main channel 5 pass to a pulse comparing device consisting of a gate and pulse storage circuit 6. At the same time an audio signal is also derived from main channel 5 just in front of its pulse shaping circuit, permitting through appropriate audio output terminals the audio signal to be amplified by monitoring amplifier 7 and the audio signal derived from the area to be protected, to be observed directly.

Circuit 8 picks up the ambient signals which must be eliminated or nullified in order to permit the activating signals to properly exercise the alarm function; circuit 8 is in essence, the same preamplifier design as activating preamplifier 1: a nullifying pickup or electromechanical transducer controls transistorized preamplifier which is designed to pick up sounds which should *not* register an alarm condition, such as sounds produced by hammering, steam pipes, motors, bells, horns, etc., or the effects of thunder and lightning.

In accordance with the invention, a given condition encompassing a group of sounds which could become a problem if not an outright alarm sound, exists only when the amplitude of the sound at the "active" sound pickup device controlling preamplifier 7 exceeds the level required to cause the main channel 3 to start producing pulses.

In a specific installation, nullification circuitry 8 and its pickup must be operated in a manner to use the nullifying effect characteristic of the invention to its full advantage. More specifically the corresponding nullification pickup should be placed as far from the source of an alarm sound as is practical. The preamplifier 8 proper can be connected by means of any ordinary two-conductor wire 9 to the preamplifier input 10 of a nullification channel 11 which may be constructed mechanically and electronically in the same manner as the alarm activating or main channel 5.

Pulse delay and shaping circuits 12 controlled by nullification channel 11 are adapted to delay the pulses received from the nullification channel 11 for a time period which is adjustable on the order of from 10 milliseconds to over 300 milliseconds, if necessary. This electronic time delay of the pulses is required to compensate for the additional distance which sound must travel in the air and the associated acoustical time delay before these problem sounds arrive at the "active" pickup device controlling preamplifier 1, which is connected to the microphone input 3 of main channel 5.

The delayed nullification pulse at the output of part 12, will now coincide timewise with those pulses as derived from an "active" sound is produced when the problem sound or sounds reach the "active" microphone pickup device controlling preamplifier 1.

Gate and pulse storage circuitry 6 is constructed so that it will store the active pulses received from main channel 5 until a number of pulses is received corresponding to the preadjusted number of pulses derived from pulse delay and reshape circuit 12. Then, and only then, an alarm pulse can be obtained or produced by circuitry 6.

Circuitry 6 is further inhibited from storing an active pulse if a delayed inhibited pulse should arrive at the same time as the active pulse. Since, the time period of these pulses is quite short as compared with the reaction time of any human being, it is therefore practically impossible for any intruder to circumvent the operation of the pulse gate circuitry 6 by trying to somehow synchronize his actions with some sound for which the nullificator circuits have been adjusted.

Figure 2:
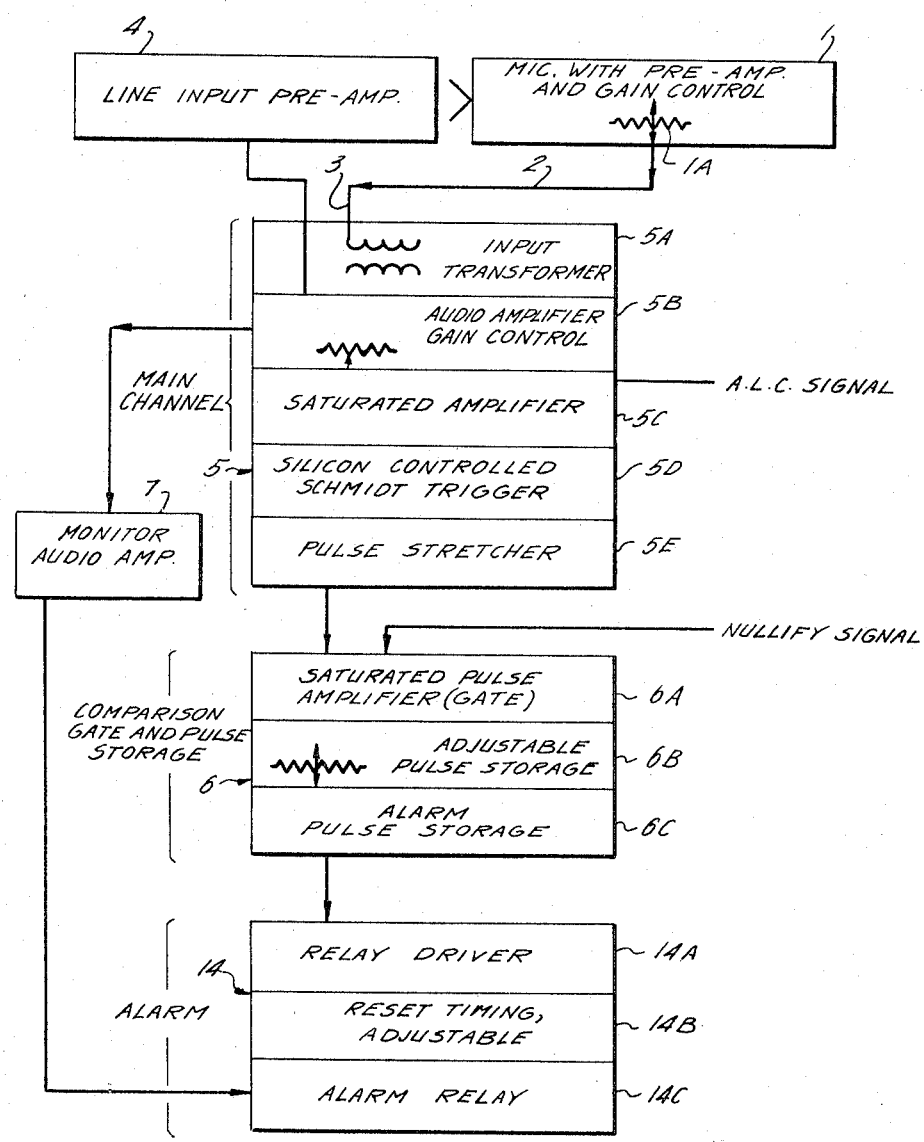
FIG. 2 represents a more detailed block diagram of the main or alarm activating channel shown in FIG. 1. The main channel contains the section required for the operation of the system except the nullification and the automatic level control channels.

FIG. 2 shows in block diagram some of the principal components of main channel 5 and associated equipment.

Main channel 5 contains an input transformer 5A which is connected to microphone controlled preamplifier 1 provided with an automatic gain control as schematically indicated at 1A.

Transformer 5A is connected together with line input preamplifier 4 to audio amplifier 5B also provided with a gain control, and which controls a saturated amplifier schematically indicated at 5C connected to a silicon controlled Schmitt type trigger circuit which acts as a pulse generator, and which is connected over a pulse stretching circuit schematically indicated at 5C, to comparison circuit 6.

More specifically pulse stretcher 5C connects to a saturated amplifier forming the gate 6A of comparison circuit 6, and is connected to an adjustable pulse storage device schematically indicated at 6B controlling alarm pulse generator 6C.

Pulse generator 6C is connected to relay driver amplifier 14A of alarm device 14 which in turn controls over an adjustable reset circuit 14B alarm relay 14C.

Figure 3:
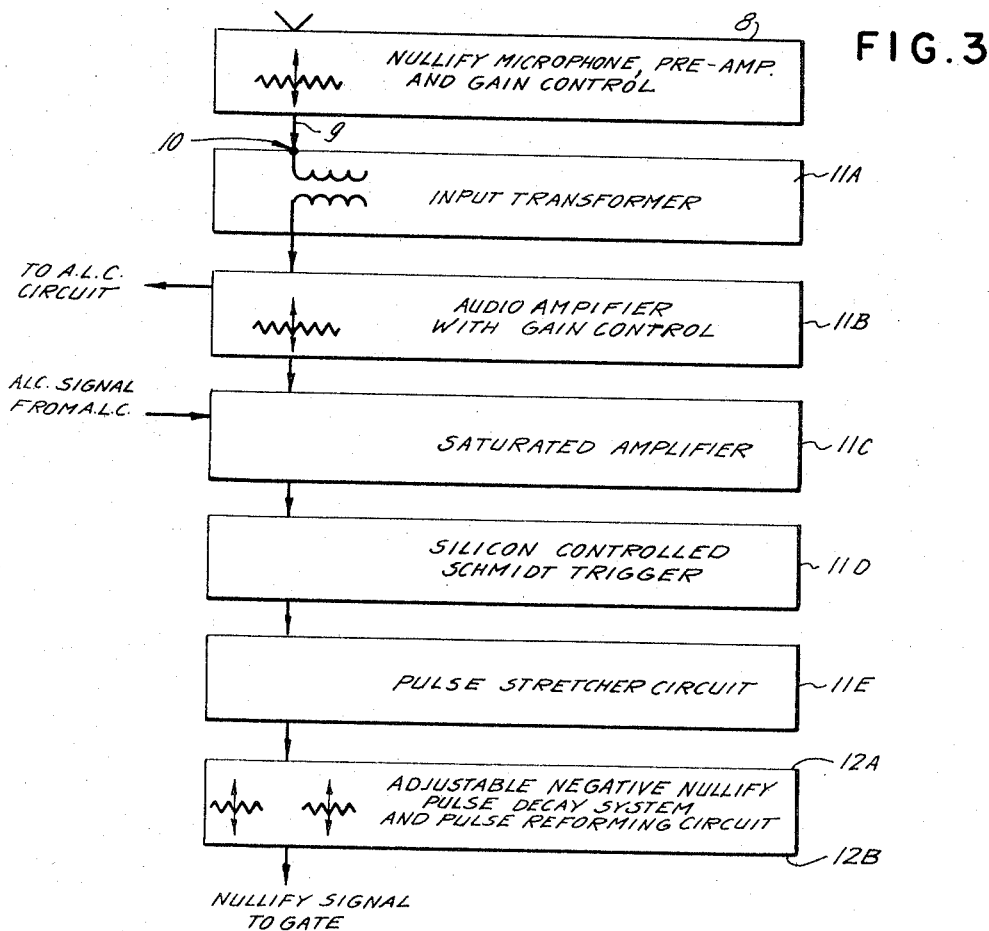
FIG. 3 illustrates in block diagram the nullifying channel, naming important circuit areas.

As apparent from FIG. 3 the nullify channel 11 which is controlled by nullify microphone preamplifier 8, consists of an input transformer 11A connected over audio amplifier 11B with gain control to saturated amplifier 11C which controls over the Schmitt type trigger circuit 11D a pulse shaping circuit 11E which is directly connected to a pulse delay circuit 12A which pulses the comparison circuit 13 and which serves to produce an adjustable negative pulse of proper delay and pulse shape adapted to operate the gate in the comparison circuit 6.

FIG. 4 shows in block diagram the automatic level control circuit 13 which receives the signal from nullify channel 11 and contains saturated amplifier 13A connected over a storage circuit 13B and a ratio adjustment device 13C on the one side to the saturated amplifier 11C of nullify channel 11 and on the other side to saturated activating 5C.

FIGS. 5, 6, 7, if arranged side by side, represent in greater detail specific circuitry which may be used to accomplish some of the objects of the invention.

Preamplifier or active sound pickup arrangement 1 is shown to contain at M1 a type of small loudspeaker acting as "active" pickup device and selected for its impedance and frequency response, and output voltage characteristics, and connected at one terminal to ground side and at the other to potentiometer R1 to adjust this active sound pickup to the location of installation, particularly when several active sound pickups are used in one installation. The signals derived from R1 (as a result of sound waves moving the cone and attached coil in the magnetic field of the loudspeaker) pass through L1 and C1 to the base of transistor Q1. L1 is an RF choke of appropriate value to present a low inductive reactance to all audio frequencies of interest, but a high inductive reactance to all radio frequencies. C1 is a capacitor of such value that it has a capacitive reactance which will resist the flow of the lower frequency audio currents and will allow the higher frequency audio currents to pass through with but slight losses.

Transistors Q1 and Q2 are wired so as to form a direct coupled amplifier circuit with the signal current passing into the base of amplifying transistor Q1. Then a portion of the amplified current from the collector of the transistor Q1 passes directly into the base of transistor Q2. Transistor Q2 provides further amplification of the signals, so that at the collector of transistor Q2, the signal current is a highly amplified audio current. It is this particular audio current which follows the variations of the audio current generated by loudspeaker M1 as sound strikes the cone of the loudspeaker.

The other components associated with active sound pickup arrangement 1 are primarily for the purpose of providing the proper bias and feedback stabilization currents so as to make this circuit a highly stable, directly coupled, high gain preamplifier.

Resistors R2 and R3 are the emitter and collector resistors, respectively, of transistor Q1. Resistor R4 and capacitor C2 comprise a coupling network so as to provide filtered DC for the very low level amplifier stage composed of transistor Q1 and associated components. Resistors R5 and R6 in series comprise the emitter resistance of transistor Q2. The collector load resistance of Q2 is in the input circuit of main channel 5. The emitter resistance of Q2 is split into two parts so as to provide a bias feedback network to stabilize the DC bias current of this direct coupled amplifier. C3 is the bypass capacitor of R6 to bypass audio frequencies. Resistor R7 establishes the DC bias current of transistor Q1. Resistor R8 provides audio signal feedback current from the collector of transistor Q2 to the emitter of transistor Q1. This becomes a negative feedback and thus stabilizes the gain and audio frequency characteristics of this amplifier. When appropriate values of resistance are used with the proper silicon transistors, this current will be stable both in bias, gain, and output impedance over a wide temperature range.

The DC to operate this preamplifier is supplied through the input transformer T101 in section 5. Direct current consumption of this circuit is stabilized by the DC feedback circuit so that within reasonable limits of DC power supplied to this preamplifier, no deterioration of gain will be observed.

Now, after having amplified the level of the very small currents from loudspeaker M1 to a much higher current level, the signals are connected over line 2, which may be an common two-conductor wire, to the proper input terminals of main channel 3. Thus, it may be seen that the load resistance of transistor Q2 is one half of the primary of input transformer T101. It is possible through the use of the correct transformer to connect many, possibly up to 50, of these units in parallel into input 3 of main channel 5.

The feature of connecting numerous active sound pickups to input 3 without losing a significant amount of signal due to shunting, may be explained as follows:

Transistor preamplifier 1 is looking into a load impedence of ½ of input transformer T101 which is on the order of 250 ohms impedance. The output impedance of transistor Q2 in this configuration is on the order of between ten thousand and twenty thousand ohms. By a normal Ohm's law calculation, it may be very readily established that connecting as many as 50 active sound pickups to input 3 will cause less than a 50% loss of signal due to shunting by active sound pickups other than the active sound pickup which is generating the signal current, and yet a maximum amount of signal current will be used to excite the first transistor in main channel 5.

The direct current for proper operation of active sound pickup preamplifier 1 is supplied through ½ of the primary of transformer T101, and it is fed into the center tap, CT, of transformer T101, coming through fuse F101 from the plus 14 volt DC supply. The primary of transformer T101 has a relatively low DC resistance, of the order of 18 ohms, thus very little voltage drop is incurred by supplying direct current to the preamplifier through T101. Another input connection 3' is available to receive signals from and supply direct current to preamplifiers. Input 3 is connected to the opposite end of the primary of transformer T101, and in practice it is suggested that the preamplifiers be divided approximately equally between these two input connections 3 and 3' so that the opposing direct currents through the primary of transformer T101 will tend to avoid saturation in the core of T101. T101 has an impedance ratio of the order of 1:3. Thus with the attendant current gain and improved impedance matching to the input impedance of transistor Q101, less audio gain is required from the remaining audio circuits in the main channel, and by the use of a smaller number of active components in the circuit a better signal to noise ratio may be achieved.

The common two-conductor wires 2 connecting active sound pickup 1 to the proper input 3 of main channel 5, must be connected by observing the proper polarity so that the lead from the collector of transistor Q2 in the high gain preamplifier is connected to the terminal 3 which has positive direct current supplied to it, and the ground side of the preamplifier must be connected to the ground side of the main unit so as to provide a return path for the direct current which operates the preamplifier.

Continuing the description of main channel 5, C102 constitutes a coupling capacitor which passes audio signals to the base of transistor Q101 while blocking the DC bias which is on the base of Q101, so that it is not shunted to ground by the secondary winding of transformer T101. Also C102 tends to additionally filter the audio frequencies so as to establish the desired frequency response characteristics.

R101, R102, respectively, represent the emitter resistor of Q101 and the base bias resistors of Q101 which establish the correct operation point for Q101 when used in combination with R104, the collector load resistance. The audio signals amplified by transistor Q101 in a normal manner, are coupled from the collector of Q101 to the potentiometer R105 through capacitor C103. C103 acts as a blocking capacitor for the DC at the collector of Q101 and also as additional audio frequency filtering by having a value of capacitance which will tend to attenuate the lower audio frequencies considerably more than the higher audio frequencies.

Potentiometer R105 serves as a gain control for the overall gain of main channel 5 so that the system may be more easily adjusted to fit a specific installation.

C104 couples the signal from R105 to the base of transistor Q102 through resistor R106. C104 also acts as a DC blocking and frequency discriminating capacitor as previously indicated for C103.

Transistor Q102 and its associated components comprise the saturated amplifier indicated in FIG. 2 at 5C. Q102 is operated with its emitter grounded and is operated in a state commonly referred to as saturation. Thus R110, the collector resistor of Q102 supplies the collector current to Q102 and the value of R110 limits the maximum collector current at the times which the transistor is in the saturated state. An appropriate value for R110 will provide for efficient operation by preventing the use of an excess amount of direct current from the plus 14 volt supply, and yet will provide suffcient current to give an adequate output signal to the next stage. The state of saturation of Q102 is established by bias currents flowing through R108, R106, and R107. Also R109 supplies the aforementioned variable bias current from the ALC circuit 13, when used. When positive DC bias is supplied to the base of Q102 in order to maintain it in the saturated condition, the base to emitter junction becomes a forward biased diode with a voltage drop of the order of approximately .6 volt DC. This positive bias curent is flowing through R106, and the amount of this bias current is determined by the values of R106, R107, and R108, and also the exact value of the plus 14 volt supply. Thus, by means of a voltage divider R107 and R108 and a series dropping resistor in series with the forward biased base to emitter junction of Q102, the positive DC curent into the base of Q102 is established.

This bias current into Q102 base produces a voltage drop across R106 while flowing through R106.

It can be seen that only negative going signals at the base of Q102 will cause any change in voltage at the collector lead of Q102. Only negative going signals at the base of Q102 can take transistor Q102 out of the saturated state, and thus allow positive direct current through R110 to charge the plate of C105 and the collector capacitance of Q102 towards the plus 14 volt supply at a rate determined primarily by the time constant of R110 and C105. Thus, positive going signals only are seen at the collector of Q102 and on the plate of capacitor C105 which is connected to the collector lead. The value of capacitance C105 is the determining factor as to which frequencies will more readily pass through the C105 and affect the following circuits, that is Q103 and its associated components. When a pulse of the proper rate of rise passes through C105, this positive pulse, if it is of sufficient amplitude, passes through silicon diode D101 to the cathode gate of silicon controlled switch Q103.

The circuitry associated with Q103 is of common knowledge but within the framework of our alarm system two items are of specific advantage with regard to application of this circuit to alarm systems. This circuit acts as a threshold detector, a pulse forming circuit, and a pulse repitition rate limiter. The output of this circuit appearing across R113 is a very precise pulse of fixed amplitude and fixed pulse duration. Also the maximum pulse repitition rate is limited by this circuit. The proper operation of this circuit depends on the charging and discharging time constants of certain capacitors and resistors in this circuit plus the specific characteristics of the silicon controlled switch used for Q103.

This circuit serves to accomplish certain parts of invention mentioned in section 5D, FIG. 2. Section 5E FIG. 2, the pulse stretching circuit may be assembled by the use of transistors Q104 and Q105 with associated components. Base of transistor Q104 is connected directly to the cathode lead of Q103 so that the output pulse from Q103 passes directly into the base of Q104. Q104 is connected in a circuit arrangement commonly described as an emitter follower circuit. This provides a low output impedance so as to rapidly charge a capacitor in the following circuit. This capacitor C107 is employed as a current storage capacitor and its charging path is described as follows: Current from the plus 14 volt supply flows through transistor Q104 from collector to emitter when a pulse is seen at the base of Q104. The current continues through silicon diode D104 and resistor R117 to the plate of capacitor C107. R117 limits the maximum current through Q104 so that Q104 will not be damaged. D104 allows current to flow only in the forward direction so as to charge C107. No current can flow in the reverse direction so as to discharge C107 through D104 and Q104. The discharging path for C107 involves resistors R118, R119, R120 and Q105. Because of the values of these specific resistors, R118 primarily determines the discharge time constant of C107 along with the value of C107. Transistor Q105 is employed in circuit in the common emitter configuration. The signals at the base lead of Q105 are pulses of a rapid rise time characteristic, and slow fall-time characteristic. While the pulse at the base of Q105 is of sufficient amplitude to saturate Q105, current from collector emitter through Q105 is at its maximum value which is limited by resistor R121, the collector resistor of Q105. Thus, a negative going signal appears at the collector of Q105. A voltage wave form at the collector of Q105 shows that the voltage falls rapidly from plus 14 volts to approximately .2 or .3 volt, which is the saturation voltage of Q105.

This circuit composed of Q104, Q105, and associated components acts in the following manner: The start of the output pulse from this circuit coincides with the start of the input pulse coming from Q103. However, the pulse length is stretched greatly with relation to the pulse length of Q103. The pulse length is stretched to approximately three times the maximum pulse repitition rate of Q103. Thus, when a continuing sound is seen at the input and Q103 continues to produce pulses at its maximum repitition rate, the output of the FMSB circuit at the collector of Q105 will appear as one long pulse. However, separate short sounds which are separated by sufficient lengths of time will appear as separate pulses at the collector of Q105.

Section 6A of FIG. 2 may be represented by the use of transistor Q302 and associated components. Operation of this saturated pulse gate amplifier is as follows: The signal at the collector of Q105 when no sounds are heard by the active sound pickup is normally plus 14 volts. Thus, the base current of Q302 is determined by the value of R307 base series resistor and with appropriate value for R307 so that sufficient base current is established, Q302 will be in the saturated state and the voltage at its collector lead will be of a low value—.2 volt approximately. The collector resistor of Q302, indicated at R309, is of a value which will properly limit the current through Q302 when it is in the saturated state, and yet on the other hand will rapidly charge C302 when Q302 leaves the saturated state. R309 is of such a value as to pass sufficient current so as to rapidly charge the capacitance C302, when transistor Q302 switches out of the saturated state. This switching occurs when the voltage at the collector of Q105 drops from plus 14 volts to a low value such as .2 volt. Then only a minimal amount of current is supplied to the base of Q302 through resistor R307 so that said switching occurs properly. Now, when this pulse ends and the voltage at the collector of Q105 begins to rise towards plus 14 volts, the switching action of Q302 does not occur until sufficient current is passing through resistor R307. This fact allows the voltage waveform at the collector of Q302 to have a much faster rise and fall time than the voltage at the collector of Q105. Resistor R310 is in the circuit so that in the event of a very long continuing sound, the unit cannot be jammed by the continuing sound.

The adjustable pulse storage circuit 6B of FIG. 2 is comprised of adjustable resistor R312, and storage capacitor C303 plus associated components. Resistors R311, R312, and R313 comprise a voltage divider from the plus 14 volt supply to ground. R312 is a potentiometer of a common type which is used as an adjustable voltage divider.

In the normal operation of this circuit the following flow of direct current is seen. Positive direct current flows through diodes D303 and D304 to the upper plate of capacitor C303 so as to charge it to provide voltage, the amount of voltage being determined by the adjustment of R312 and the leakage currents in the circuit. This provides for establishing the base of the staircase in the voltage waveform representing the charge on C303. The base of this staircase is adjustable by adjusting R312 and thus raising or lowering the positive starting potential on C303. When a pulse is seen at the collector of Q302 and on the plate of capacitor C302, the positive going portion of this pulse produces a positive current through diode D304 to the upper plate of capacitor C303, adding to the initial charge placed on C303 by the adjustable portion of the circuit. Now when a series of pulses follow each other in this manner, allowing sufficient time between the pulses for the capacitor C302 to recover to equilibrium, these pulses continue to add a portion of charge to the plate of C303 so as to produce the staircase like waveform.

The height of the steps in this staircase waveform depends on the ratio of the capacitance of 302 to the capacitance of C303. A capacitance ratio on the order of 1:10 may be desirable for stability and positive acting circuitry. Assuming a continuing series of sounds, the staircase waveform continues until a threshold level is reached in the alarm pulse generator 6C if FIG. 2, which is comprised of unijunction transistor Q303 and associated components.

Further describing the operation of the adjustable pulse storage circuit and alarm pulse generator circuit, each pulse adds a definite amount of charge to capacitor C303 although the threshold level of the following circuit is a fixed voltage level; thus it can be seen that by adjusting the base or starting level of this staircase waveform by means of the adjustable potentiometer R312, the number of steps in this waveform may be adjusted.

With suitable components in this circuit adjustment may be obtained for values between 1 pulse and as many as 14 or 15 pulses. If the circuit is adjusted for example, for 5 pulses and 3 pulses are received, the alarm pulse generator Q303 will not be triggered and will not produce an alarm pulse at its output. If a considerable length of time, possibly 30 seconds elapses, it is desired that the circuit return to the base of the staircase so that again it will take five pulses to produce an alarm pulse. This is accomplished by means of resistor R314 through which the charge accumulated on C303 as a result of pulses can slowly discharge. This resistor R314 is of an appropriate value, possibly between 2 to 5 megohms. This circuit D304 also prevents discharging of any of the charge from C303 back through D304 and the other components prior to D304 in the circuit, although until the threshold of Q303 is reached, no current flows in this direction because of the nature of the unijunction transistor circuit which is to be more fully described.

The emitter characteristics of a unijunction transistor are as follows:

(1) A stable triggering voltage which is a fixed fraction of the applied interbase voltage;
(2) A very low value of firing current;
(3) A negative resistance characteristic which is uniform from unit to unit and stable with temperature and life, and;
(4) A high pulse current capability.

When unijunction transistor Q303 is in the state commonly called the cut-off region, the interbase resistance is between five thousand and ten thousand ohms. Resistor R316 is connected from base one to ground and resistor R317 is connected from the plus 14 volt DC supply to base two. These resistors have appropriate values for the unijunction transistor used, as specified by the manufacturer. Resistor R315 is used so as to bias Q303 near its peak point, thus minimizing the current required for triggering Q303. As additional charge is stored on capacitor C303 as a result of pulses; eventually the voltage on C303 will equal the peak point voltage of unijunction transistor Q303 plus the forward voltage drop of diode D305, a silicon diode with forward voltage drop of approximately .6 volt, and supply sufficient firing current to cause unijunction Q303 to switch to its negative resistance region, thus rapidly discharging capacitor C303 through diode D305, into the emitter of Q303, out from base one of Q303, through R316 to ground.

As capacitor C303 is discharged through this current path, the current through this circuit falls off at a rate determined by the RC time constant of the circuit. When the current reaches a sufficiently low value, unijunction transistor Q303 will return to its cut off region thus restoring the circuit to the original stable condition, and awaiting another chain of pulses to charge C303 up to the peak of Q303. The output pulse from the unijunction Q303 is obtained at the base one connection which is also R316. This output pulse has a very short rise time so as to provide the proper pulse waveform for the alarm relay driver, circuit 14A of FIG. 2.

This unijunction transistor Q303 is also used to discharge the charge which has been accumulated on storage capacitor C303 in order that the pulse storage circuit be ready to accept a new series of pulses starting from the base of the waveform. When an alarm pulse has been produced by the unijunction transistor Q303 and associated components, this alarm pulse proceeds through current limiting resistor R401 to silicon controlled switch Q401. Q401 is employed as a solid state relay driver which has two stable states, the conducting state, and the nonconducting state. The alarm pulse which is limited by resistor R401 feeds positive current into the cathode gate lead of Q401 triggering Q401 to the "on" state. The remaining resistors in the circuit R402, R403, and R404 are of appropriate values to limit the maximum currents in the associated circuits of Q401. When Q401 is in the "off" state, no current is flowing through relay coil K401 to ground. When Q401 is in the "on" state, current passes through relay coil K401 thus moving the armature and attached contacts of K401 into a position which may be designated the alarm position. Both normally opened and normally closed contacts are provided so that the system may be adapted easily to operation with many different types of equipment.

Furthermore, when K401 is energized by current flowing through it, there is a voltage drop across the coil of K401 of approximately 12 volts DC which starts and maintains current through R406 and potentiometer R408 to charge capacitor C401. This resistance and capacitance form a time constant circuit which may be used for the adjustable reset timing circuit 14B of FIG. 2.

Unijunction transistors Q402 and Q403 with their associated components are shown in a timing circuit which may be used to control the time period which the alarm relay K401 and relay driver Q401, remain in the "alarm" condition before resetting to the "no alarm" condition. With the proper unijunction transistors, this circuit is capable of timing up to a considerable length of time. As shown the circuit is adjustable from approximately 3 seconds to approximately 300 seconds. At the end of the timing cycle, capacitor C401 has charged up sufficiently so that unijunction Q402 reaches its firing point and discharges the charge of capacitor C401 through R410 at a rate determined by the time constant of C401 and R410. This action produces a negative pulse on C401, which coupled to the anode of silicon controlled switch Q401, turns off Q401 so as to terminate the "alarm on" condition and produce an "alarm off" condition.

Q403 is a pulse generator producing pulses at a repetition rate of approximately 20 pulses per second. At the emitter of Q403 these are negative going pulses of approximately 6 volts peak pulse height. These negative pulses are coupled by capacitor C402 to base two of unijunction transistor Q402, so as to reduce to an absolute minimum value the amount of current required to fire Q402. This pulse is coupled by capacitor C404 to the adjustable arm of potentiometer R419 which is located across the primary windings of the input transformer T101 as shown in FIG. 2 at 5A.

In accordance with the invention a pulse system is used for monitoring the condition of the microphone connecting leads so as to provide a tamper-proof circuit which, if properly adjusted, balances the amount of pulse current which flows in each half of the transformer primary. This adjustment depends upon the number of microphones across the circuit and the particular characteristics of the input transformer. If, while properly adjusted, one of the several microphones connected to the unit is disconnected, a pulse current will flow in the secondary of the transformer T101 as the pulse current flowing in the halves of the primary will be unbalanced. As a result of the pulse current in the secondary of T101 the system will, in due time, go into alarm condition. Thus, the system may be protected against someone cutting one of the signal leads. Shorting any of these leads will cause fuse F101 to burn out, again resulting in a drastic change in the impedance appearing at the input terminals and a pulse will appear at the secondary of transformer T101 because of an unbalanced pulse condition feeding the two halves of the primary. In due time the system will go into alarm condition as mentioned above.

The monitor audio amplifier 7C of FIG. 2 may be assembled as shown in FIG. 6 by using transistor Q404 and associated components. In detail, the audio signal is coupled from the collector of Q101 by C405 to potentiometer R415. By the use of R415, the audio gain of the monitor audio amplifier may be adjusted separately from the gain main channel 5. From the adjustable cap of R415 the signal is coupled by C406 to the base of transistor Q404. The base bias of Q404 is established by the combination of R416 emitter resistor, R417, and R418 base bias resistors, and the DC resistance of the primary of T401. Capacitor C407 constitutes the bypass capacitor in parallel with the emitter resistor R416 so as to bypass the audio frequencies of interest. T401 is a line matching transformer so as to provide the proper output impedance for feeding a line signal, on the order of 500 ohms output. This signal may be fed over a typical telephone line or any other pair of wires available for this purpose. It may be coupled by the use of the proper coupling capacitor into the same lines carrying DC currents which may be hooked to the contacts of alarm relay K401 under certain circumstances.

Line input preamplifier 4 of FIG. 2 may be constructed by using essentially the same circuit as is used in the active sound pickup preamplifier 1. A difference is in that transformer T1, which is a multi-tap, impedance matching transformer, is used so that the input to the line input preamplifier may be properly matched to any audio intercom system for maximum efficiency and proper operation. The components used to assemble line input prepamplifier 4 may be of the same values as the components used to assemble the active sound pickup preamplifier 1.

Details of line preamplifier 4 are shown in FIG. 5. The components numbered L1', C1', Q1', R1', etc. L1' may have the same value as L1, etc. in circuit 1. In other words, a duplicate of the circuitry of circuit 1 may be applied. One exception is R9', the collector load resistance of Q2'. Circuit 4 is located right in the main channel, thus its signals need not be carried over extended length of connecting wires nor needs circuit 4 be wired directly in parallel with other circuitry. Therefore, it may be wired with a collector load resistor rather than an input transformer into the remaining audio circuitry. Audio signals from the collector of Q2' pass through capacitor C4' whose value is appropriate so as to provide a relatively low capacitive reactance to the higher audio frequencies and yet to introduce losses in passing the lower audio frequencies by having a higher capacitive reactance with reactance with respect to the lower audio frequencies. These signals then pass directly to the base of transistor Q101 and pass onward through the main channel in the manner stated above.

Circuitry and components for constructing the nullification channel as shown in FIGURE 3 are substantial, identical to the corresponding section of FIGURE 2 may be used. The nullifying microphone preamplifier with gain control 8 may be constructed by using exactly the same circuitry as section 1. The open wire leads 9 may be of exactly the same type as 2. Nullifying input circuit 10 may be constructed in the same manner as main channel input circuit 3. Nullify transformer input 11A corresponds to main channel input transformer 5A, nullify audio amplifier with gain control 11B to main channel audio amplifier with gain control 5B, nullifying saturated amplifier 11C to main channel saturated amplifier 5C. Nullify silicon controlled Schmidt trigger 11D to main channel silicon controlled Schmidt trigger 5D, and nullify FMSB pulse circuit corresponding to 5E. The adjustable negative nullifying pulse delay system 12A and an associated pulse reforming circuitry 12B of FIGURE 3 may be constructed of circuitry and components as follows:

The signal output from circuit 11E of FIGURE 3 comes from a transistor referred to as Q205 which corresponds to transistor Q105 in the main channel. Q205 and its collector load resistance R221 which corresponds to transistor Q105 in the main channel. Q205 and its collector load resistance R221 which corresponds to R121 in the main channel will produce an output pulse in a similar manner to the main channel when the nullify sound pick up 8 senses sound in its immediate vicinity. The output pulse from section 11E and thus from transistor Q205 is of a proper pulse shape to be acceptable to the input of circuit 12A, which is transistor Q501 and associated components. Q501 forms the first adjustable delay section. Resistor R501 limits the maximum negative going pulse seen at the base lead of Q501. Resistor R502 provides a positive base bias current into the base of Q502. Capacitor C501 forms a time constant with R502 producing a delayed output pulse as follows:

The positive direct current supplied through R502 is clamped by the base to emitter junction of Q501 so that the base voltage of Q501 is approximately plus .6 volt DC until a negative going pulse arrives from transistor Q205. This negative going pulse is formed by the action of transistor Q205 passing rapidly into the saturated state from the cut off state. In the cut off state the voltage on the collector of Q205 is determined by the values of two resistors in a series circuit, R221 and R501 which form a voltage divider from the plus 14 volts supply to the ground return. This fixes the maximum DC voltage on the collector of Q205. The minimum voltage on Q205 is established in the saturated state and is approximately .2 volt DC. Thus, a negative going pulse of a fixed maximum amplitude is seen on the plate of capacitor C501. Capacitor C501 passes this pulse through to the base of transistor Q501 thus forcing transistor Q501 rapidly into the cut off state. Capacitor C501 and resistor R502 form a time constant circuit so that over a definite period of time the plate of capacitor C501 is charged towards the positive supply by current passing through R502 from the positive supply. No current passes into the base of Q501 until the voltage at the base lead of Q501 reaches a level at which the base to emitter junction is forward biased. As the plate of C501 is charged in a positive direction, after a definite period of time established by time constant of circuit, the attached base lead of transistor Q501 will approach voltage at which the base to emitter junction becomes forward biased. When the base of Q501 becomes forward biased, Q501 switches rapidly into the saturated state producing a negative pulse on the plate of C502 by rapidly discharging C502 which is connected to the collector of Q501, to approximately plus .2 volt, from the voltage level established by the series circuit voltage divider network of R503 and R504. In like manner a negative pulse of approximately 5 volts peak pulse amplitude is generated, passing through capacitor C502 to the base of transistor Q502. Transistor Q502 comprises the active portion of the second adjustable delay stage. Resistor R502 forms a time constant with capacitor C502 so as to charge capacitor C502 at a definite rate.

It can be seen by close analysis that the negative going pulse at the base of transistor Q502 is delayed in time from the negative going pulse at the base of transistor Q501 by an amount determined by the time constant of R502, C501 and the amount of voltage supplied to R502.

Q502 operates in a similar manner to Q501 in that the negative going pulse at the collector of Q502 is delayed in time with respect to the negative going pulse at the base of Q502, by an amount determined by time constant of R505 and C502, and the voltage supplied to R505. The direct current supplied the two adjustable delay stages Q501 and Q502 and associated components through their respective charging resistors R502 and R505 is adjustable by means of potentiometer R507 and limited by resistor R508 for proper operation. Also, capacitor C503 provides decoupling and filtering for stable operation. R506 is the collector resistor of Q502 and serves to limit the maximum current through Q502 when said transistor is in the saturated state. The negative going pulse from Q502 passes onward to the base of transistor Q503 through the capacitive voltage divider of C504 and C505 which limits the peak negative pulse at the base of transistor Q503. Resistor R509 provides base bias current and current to charge capacitors C504 and C505 from the peak negative pulse towards the plus 14 volts DC supply at a rate determined by a time constant of R509 and the total capacitance of C504 and C505.

Thus, a relatively long time constant fixed delay stage may be constructed. R510, the collector resistor of Q503 limits the current through Q503 when Q503 is in the saturated state. A negative pulse is produced on the collector lead of Q503 as Q503 goes rapidly into the saturated state upon its base lead reaching the level of approximately plus .6 volt by the action of current through R509 charging capacitors C504 and C505. The negative pulse on the collector of Q503 passes through capacitor C506 to the base of Q504, the second fixed delay stage. The maximum negative pulse height at the base of Q504 is determined by the voltage divider network of R510 and R511 which provides only a fraction of the total supply voltage on the collector of Q503 so that as Q503 goes into the saturated state and voltage on the collector drops to approximately .2 volt DC, the peak negative pulse height does not exceed the capabilities of Q504 as determined from the specifications.

In a similar manner, as in the previous circuit, the base voltage of Q504 is changed towards a positive value at a rate determined by the time constant of R512 and C506. R513 limits the current through Q504 when Q504 is in the saturated state. R514 forms a series voltage divider circuit with R513 so as to limit the maximum collector voltage on Q504 and thus limit the negative going peak pulse height of the pulses on the collector of Q504.

It should be noted that no pulse is produced at the collector of one of these stages when a positive going signal is seen on the collector of the previous stage as long as the base connection of this stage under discussion has reached an equilibrium voltage of approximately plus .6 volt namely, that the delay capacitor associated with this stage has been fully charged through its time constant resistor until the base to emitter junction of this stage under discussion is forward biased and sufficient current is being delivered into the base so that the transistor is fully in saturation.

When the transistor is fully in the saturated state, additional positive current into the base lead does not produce further negative going signals at the collector of said transistor, only the following occurs: Additional base to emitter current flows in the forward biased base to emitter junction which is clamped at approximately .6 volt in a silicon transistor.

The functions of the delayed pulse reforming circuit 12B of FIGURE 3 may be performed by a monostable multivibrator modified for use with our special pulse delay circuitry. The 12B when composed of transistor Q505 and Q506 with associated components, provides output pulses of the desired fixed pulse height and fixed pulse width. The delayed negative going pulse from the proper point in the delay circuitry is coupled by capacitor C507 to the base of transistor Q505 through resistor R515.

As the base of transistor Q505 is pulsed in a negative direction, the collector lead of said transistor is charged in a positive direction by current from the plus 14 voltage supply through resistor R517. This positive going pulse is passed by capacitor C508 directly to the base of transistor Q506 tending to switch Q506 toward the saturated state and producing a negative going pulse on the collector lead of Q506. This negative pulse is passed through capacitor C509 to the base of Q505, thus holding Q505 in the off state. Due to the gain of the transistors, this circuit is acting in a regenerative manner. Once a negative pulse is seen, this circuit regenerates driving Q505 base lead to the off state by a peak negative voltage which is determined by the voltage at which the collector of Q506 rests when it is in the off state. The voltage on the collector of Q506 is determined by the voltage divider formed by the collector resistor R520 and R521.

The output pulse from the circuit is taken from the collector of Q505. The fixed pulse width at the output is determined by R516 and C509. The time constants of said components determines the period of time which this multivibrator is in its unstable state as follows: Positive direct current flowing through R516 charges the plate of capacitor C509 until the base lead of transistor Q505 which is connected to said capacitor plate by means of resistor R515 reached a level of approximately .6 volt and sufficient current is flowing into the base of transistor Q505 to put transistor Q505 into saturation, thus providing a negative pulse to the base of transistor Q506 and returning the circuit to its stable state.

The normal stable state of this circuit is described as follows: Transistor Q505 is in the saturated state as base current is being supplied to it through resistor R516 through current limiting resistor R515. R517 limits the maximum collector current through transistor Q505. Q506 is in the off state with very near ground potential.

The collector of Q506 is at the potential established by the voltage divider composed of F520 and R521 which establishes a fraction of the plus 14 volts DC supply and the maximum DC voltage supplied to the collector of Q506 so that the maximum negative peak pulse height which reaches the base of Q505 will not exceed the specified limits of the transistor type used for Q505 in operation. The output pulse from the collector of Q505 has a pulse height which depends on the resistance voltage divider of R517, R518, and R519. Maximum pulse height is approximately 12 volts. The fixed pulse width produced by this circuit for proper operation of the gate circuit and proper cancellation of the desired active pulse may be on the order of 50 milliseconds. When this pulse occurs it passes through resistor R306 directly to the base of transistor Q302 so as to tend to nullify a pulse arriving at the base of Q302 through resistor R307 if these pulses arrive in time coincidence. The negative going pulse for the input of this nullify pulse reforming circuit may be obtained from any one of four terminals in the pulse delay system 12A. These terminals are (a) the collector of Q501, (b) the base of Q503, (c) the collector of C503, and (d) the collector of Q504.

Each of these terminals provides a different range of adjustable pulse delay with overlapping ranges so that the nullifying pulses may be delayed over a range of at least approximately 6 to 300 milliseconds.

Circuitry which may be used to accomplish the functions shown in block diagram of the automatic level control (ALC) channel, FIGURE 4, will now be described. The ALC saturated amplifier with gain control 13A of FIGURE 4 may be accomplished by the use of transistor Q304 and associated components, R318 is potentiometer used as a gain control for the ALC circuit. Audio signals are coupled to R318 through C203 from transistor Q201 which corresponds to transistor Q101 in the active circuit both in circuit arrangement and operation. From the adjustable tap of R318 signals are coupled by C304 to the base of Q304. Q304 is biased into the saturated state by the base bias resistor network of R320 and R319. Thus, the collector voltage at the junction of the collector and resistor R321 is approximately .2 volt DC. When audio signals of sufficient amplitude are seen at the base of Q304 so as to allow Q304 to move out of the saturated state towards the off state, Q304 acts so as to tend to conduct less current and thus, current coming from the plus 14 volt supply through R321 now causes the voltage on the collector to rise rapidly. As the voltage rises above the forward voltage drop of diode D306, current passes through diode D306 to charge capacitor C305. The forward voltage drop in the conducting state of diode D306 is approximately .6 volt since D306 is a silicon diode which permits current only to flow in the forward direction, blocking reverse current during the time that Q304 is in the saturated state. The rate at which ALC voltage builds up on storage capacitor C305 is determined by the time constant of C305 and resistor R321 and the amount of audio signals seen by Q304 which determines the off time of Q304. When C305 has accumulated charge so that its voltage rises sufficiently, current flows from C305 through resistor R109 in the main channel to further charge C104 and to increase the base bias current of the saturated amplifier Q102. As aforesaid, this raises the threshold level of the saturated amplifier in the main channel so that a greater amount of audio current is required in order to produce signals at the collector of the saturated amplifier Q102.

In like manner, current is also fed through resistors R322 and R209 so as to produce a higher charge on capacitor C204 in the nullification channel and to increase the base bias current of saturated amplifier transistor Q202. R322 is a potentiometer which is used to perform the function of ratio adjustment 13C of FIGURE 4. By means of R322 the proper ratio of variable bias current to the saturated amplifiers both in the main channel and in the nullification channel can be established as it is desired that the nullification channel be inhibited from producing pulses in an attempt to nullify pulses at times when no pulses are being produced by the main channel. Thus the nullify channel is kept clear for necessary pulse forming and is not forming pulses unnecessarily.

FIGURE 8 represents a specially designed power supply connected to terminals G, B of FIGURES 5, 6 and 7.

Terminals X601 and X602 are for connection to power mains supplying 117 v. A.C., 60 cycle power. Fuse F601 is intended for the purpose of preventing a dangerous short circuit across the power mains in the event of a major power supply component failure. A full wave bridge rectifier with capacitor input filter may be used, making use of power transformer T601, silicon diodes D601, D602, D603, D604, and electrolytic capacitor C601, each component of proper value so as to produce direct current with a suitably low ripple factor on the order of 0.5 percent, at the maximum current which the supply must provide for proper operation of all the aforesaid circuitry.

Silicon power transistor Q601 used here as a series regulator, is of a type having adequately high power and current capabilities while at the same time having a relatively high current gain characteristic as required for proper operation of our electronic regulator-filter circuit. Resistor R601 is of the proper value to limit the maximum current in the event of a short circuit or temporary overload so that no damage will result. Silicon transistor Q602 performs the function of a shunt-type current regulator amplifier by shunting more or less current away from the base lead of Q601. Thus, through the current gain action of Q601, less or more current respectively is allowed to pass to the power supply output and the load. Current is supplied to the base of Q601 through resistors R602 and R603 with capacitor C602 providing additional filtering so that said current has a very low ripple factor. Special low current silicon Zener diode D605 is used as the voltage reference for the reference amplifier Q602. The resistance voltage divider formed by resistor R604, potentiometer R605, and resistor R606 performs the dual functions of supplying the proper operating current to D605 and, supplying a sample current to the base of Q602. The amount of said sample current is primarily dependent on the output voltage of Q601, and the adjustment of R605 in conjunction with the values of R604, R606, the Zener voltage of D605, and the characteristics of Q602. Silicon diodes D606, and D607 provide a method of automatic switchover from power supply mains operating to battery operation if desired. R607 may be incorporated into the circuit so as to provide a current of appropriate value for trickle charging battery B601, if desired. Battery B601 is a type having a low internal impedance such as nickel-cadmium.

We claim:

1. In a sound controlled alarm system, first sound pickup means arranged at locations exposed to alarm activating noise; second sound pickup means, arranged at locations exposed to ambient noise, means under control of said first sound pickup means, for producing pulses representative of said alarm activating noise, means under control of said second sound pickup means, for producing pulses representative of said ambient noise, means for comparing said pulses to nullify said ambient noise from said alarm activating noise, and means under control of said comparison means for producing an alarm signal; said first and second sound pickup means including each at least one electromechanical transducer, and a pre-amplifier of substantially similar construction; and automatic level control means controlling each of said pulse producing means in accordance with the level of said second pulse producing means.

2. System according to claim 1, wherein such two pulse producing means include each an input transformer connected over an audio amplifier and a saturated amplifier to a puse trigger circuit having a pulse shaping output and said comparison means include a saturated amplifier acting as a gate connected over a pulse storage circuit to said alarm means.

3. System according to claim 2, wherein said second pulse producing means include pulse delaying and reshaping means to produce an adjustable negative pulse reshaped and delayed to nullify the ambient noise in the alarm activating noise.

4. In a sound controlled alarm system according to claim 1, a first threshold detector controlled by the first pickup and including means for varying the threshold level so as to automatically increase or decrease the threshold under control of large periodic variations in the ambient sound level, to simplify the complex audio signal wave into positive going signals when the threshold level has been surpassed and radio frequency filtering means and audio frequency filtering means immediately preceding said first threshold detector and adapted to accept predetermined audio frequencies only; and a second threshold detector in combination with a precision pulse forming circuit, controlled by the second pickup, to further simplify the signals into pulses of fixed height, fixed width, and maximum repetition rate; the pulses being produced only when a predeterminedly fixed second threshold level is surpassed; the second threshold being a trigger circuit so designed that when a fixed threshold level is exceeded, the signals are simplified from signals of variable amplitude into signals of fixed amplitude, an alarm pulse being formed only when sound signals detected and amplified have exceeded the first threshold detector level thus producing positive going alarm signals only upon having exceeded the second threshold level after sufficient time has elapsed since the formation of a preceding pulse.

5. In a sound controlled alarm system according to claim 1, separate apparatus for sound and ambient sound respectively, to pick up, adjust the amount, amplify and filter sound including ambient sound, means under control of the first pickup for providing an electronically adjustable first threshold detector to simplify the signals when the first threshold is exceeded by ambient sound, means under control of the second pickup for providing a second threshold level to produce a precise nullifying pulse when the second level is exceeded so as to further simplify the signal representative of ambient sound to be nullified, and means including a gate for delaying the nullifying pulse for a period of time so that it will arrive at the gate at the same time as an active pulse caused by the sound to be nullified which was delayed a period of time by the nullification sound having travelled much farther through air to reach the active sound pickup than to reach the nullification pickup.

6. System according to claim 5 comprising delaying means adjustable for a time delay from 10 milliseconds to 300 milliseconds, the nullification pulse shape being such as to allow for a tolerance in the matching of pulses.

7. In a sound controlled alarm system according to claim 1, alarm means, means under control of one pickup for producing alarm activating noise, means under control of the other pickup for producing ambient noise, means under control of said activating noise for producing a train of pulse of predetermined width and amplitude and of a repetition rate depending upon said activating noise, means under control of said ambient noise to produce a train of pulses of predetermined width and predetermined repetition rate and of substantially the same amplitude as said activating pulses; and gating means operative upon the coincidence for a predetermined period of pulses of both said trains to operate said alarm means.

8. System according to claim 7 wherein both said pulse trains have pulses of the same predetermined width and comprising means for selectively varying the width of the ambient pulses to deactivate at least part of the effect of said ambient pulses.

9. System according to claim 7 wherein said gating means include a saturated amplifier operative upon the coincidence of positive and negative pulses derived from the different pulse trains to produce a discharge current and comprising means for reversing the polarity of the pulses of the activating pulse train.

10. System according to claim 7 comprising means for selectively and adjustably stretching the pulses of the activating means for a duration of several pulses to permit at least part of the ambient sound for at least part of the time to be ineffective, and comprising in the ambient pulse producing means an adjustable delay circuit to compensate for the accustical time delay of a given location of the ambient sound, and storage means being provided, preceding the gating means and adapted to store the pulses derived from said activating pulse-producing means until a predetermined number of said pulse are stored.

References Cited

UNITED STATES PATENTS

| | | |
|---|---|---|
| 2,216,452 | 10/1940 | Owen. |
| 2,907,012 | 9/1959 | Pitman et al. _____ 340—261 X |
| 3,109,165 | 10/1963 | Bagno _____ 340—258 |

JOHN W. CALDWELL, *Primary Examiner.*

D. L. TRAFTON, *Assistant Examiner.*

U.S. Cl. X.R.

340—276